Jan. 24, 1939.   R. STOPP   2,144,901
PROFILING DIAMOND
Filed June 25, 1937
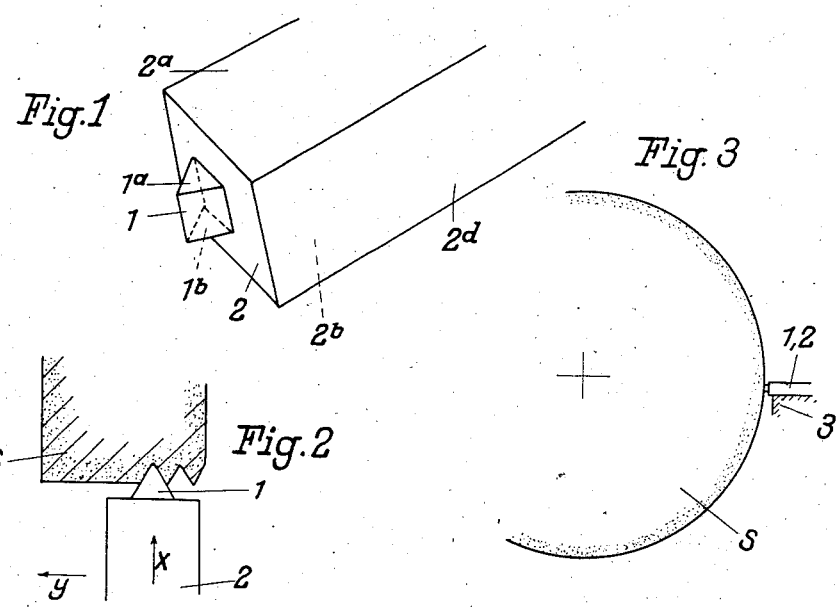
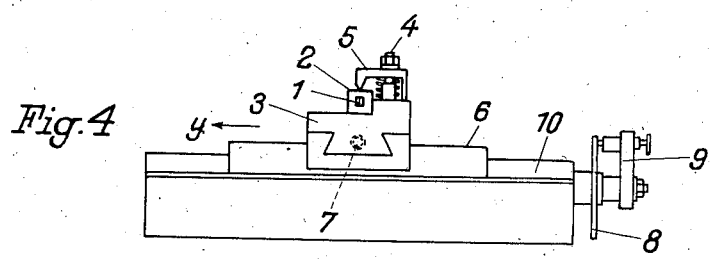
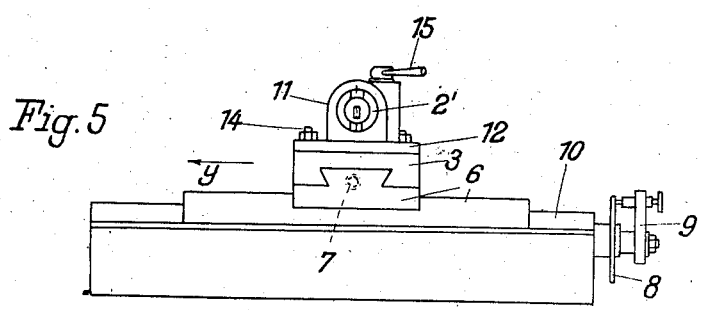
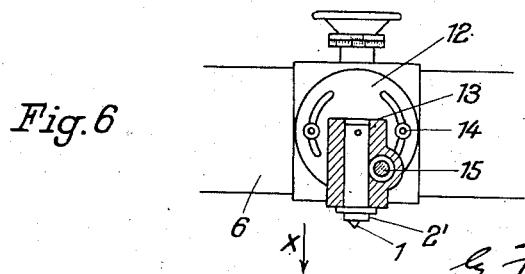
Inventor:
Robert Stopp
by Frank S. Appleman
attorney.

Patented Jan. 24, 1939

2,144,901

UNITED STATES PATENT OFFICE 2,144,901

PROFILING DIAMOND

Robert Stopp, Berlin-Charlottenburg, Germany, assignor to Herbert Lindner, Berlin-Wittenau, Germany Application June 25, 1937, Serial No. 150,423
In Germany August 18, 1936

3 Claims. (Cl. 125—39)

The present invention relates to profiling diamonds for cutting profiles in a rotating grinding wheel, especially in a grinding wheel for the grinding of screw-threads.

The object of the invention is to provide an improved profiling diamond which is more economical in use and at the same time more efficient.

The known profiling diamonds comprise a polished cutting edge formed to correspond to the profile of the groove to be produced in the grinding wheel. The cutter front is ground under a certain free angle to the surface to be dressed of the grinding wheel. The profiling diamond is embedded or clamped in a holder, fixed in a device which allows the tool to be moved radially and parallel to the surface of the grinding disc. As the diamond only has a single profile cutting edge, its utilization is comparatively unsatisfactory.

According to the present invention the diamond is therefore so formed that it has two cutting edges of the same shape disposed opposite to each other. This has the advantage that after wear of one cutter has occurred the other can immediately be brought into operation by turning the diamond holder about 180°.

The utilization of the new diamond is very much better than that of the single cutting edge diamond, being twice that of the latter with a diamond of uniform crystal structure. The double cutting profiling diamond has furthermore a much stronger form than the single edge cutter so that greater stress can be applied, and it is therefore more efficient.

Suitably the profiling diamond is placed in a holder of rectangular cross section in such a manner that two opposite holder surfaces run parallel to the cutting surfaces and serve as supporting surfaces. One of the lateral surfaces of the holder is laid against an abutment surface of the device and the holder is clasped. The profiling diamond is then exactly in the desired position with respect to the circumferential surface of the grinding wheel. The other cutting edge can then be brought into the operative position by turning the diamond holder about 180°.

According to a further constructional form, the diamond holder is arranged to be rotatable in a support, which is adjustable in a plane disposed parallel to the working position of the cutting surface. This second movement is exclusively utilised for setting the tool, while the rotatable arrangement is also utilised for turning the diamond holder in order to change the cutting edge.

In order that the present invention may be readily understood, some constructional forms of the invention are illustrated in the drawing, in which Figure 1 shows the profiling diamond,
Figure 2 shows it during penetration into the grinding wheel,
Figure 3 illustrates a suitable setting position with regard to the grinding wheel,
Figures 4 and 5 are end views of two constructional examples of dressing devices which are equipped with the new diamond, and
Fig. 6 is a fragmentary horizontal section of Fig. 5.

The profiling diamond 1 shown in Figures 1 and 2 is for example intended for profiling a grinding wheel S for the grinding of pointed screw-threads (Whitworth screw-threads). Accordingly, the cutting edges $1^a$ and $1^b$ of equal size, arranged opposite each other according to the present invention, have a triangular shape with rounded tips. The cutting surfaces are disposed in parallel planes (normal profile planes). The wedge angles of the cutters are then 90°.

The profile of the cutters can of course also have a different shape; for example it can be of trapezoidal shape in order to cut grinding discs for the grinding of trapezoid screw threads.

The diamond is so adjusted in the holder or the holder is so prepared according to the diamond that the surface $2^a$ of the holder 2 (Figure 1) is parallel to the cutting surface $1^a$ of the diamond and the holder surface $2^b$ is parallel to the cutting surface $1^b$. During use of the cutting edge $1^a$ the holder surface $2^b$ serves and during the use of the cutting edge $1^b$ the holder surface $2^a$ serves as supporting surface. The lateral surfaces $2^c$ and $2^d$ respectively serve as abutment surfaces, which co-operate with a counter abutment on the device. In the device according to Figure 4 the counter abutment is formed from one edge of the cross slide 3, on which the penetrating tool is rigidly clamped, for example by means of a clamping screw 4 and a clamping iron 5. However setting screws or the like can also be provided as counter abutments. The cross slide 3 is adjustable on the lower slide 6 by means of a screw spindle 7, so that the tool can move in the direction of the arrow $x$ radially to the grinding wheel S and penetrate into it. The depth of the profile is determined through a stop device (not shown) or with the help of a measuring drum (not shown) located on the setting spindle 7. When the profile has been cut the slide 3 and therewith the tool 1, 2 are drawn back and the lower slide 6 is displaced in the direction of the arrow $y$ along the grinding disc S by the amount of its groove pitch on guides of the frame 10. The actuation of the lower slide 6 can, for example, be effected by means of a screw-spindle, not shown, in accordance with a dividing disc 8 from a dividing crank 9. After displacement by one divisional step the penetration of the next profile groove in the grinding wheel takes place, and so on until all the profiles are produced.

In the same manner worn grinding wheel profiles are renewed by re-cutting. If the one diamond cutting edge has become spoilt, by turning the holder 2 about 180° the other cutter is brought into the operative position. The diamond tool may be adjusted to the centre of the grinding wheel; suitably however, as shown in Figure 3 it is disposed below the centre of the grinding wheel so that a free angle results. The profile of the diamond in this case is modified to correspond to this setting position. In the device shown in Figures 5 and 6 the diamond is secured in a holder 2' of circular cross section. The holder 2' is accommodated in a support 11 rotatable about a horizontal axis. The support is connected with a rocking plate 12 which is arranged on the cross slide 3 so as to be adjustable about a vertical axis 13 in a plane parallel to the operative position of the cutting edge and is rigidly clamped by means of the screws 14. Through this arrangement the cutting edge of the diamond can in a simple manner be adjusted with reference to the model diagram of an optical observation apparatus. By rotating the holder 2' about 180° in the support 11 the other cutting edge is brought into the operative position. This position of the holder 2' is locked through a jamming cam 15.

I claim:

1. In a profiling diamond having two cutting edges comprising a pair of surfaces of the same shape oppositely disposed to each other, the said surfaces being interchangeably operative when the diamond is turned about 180°, a holder for the diamond rectangular in cross section, said holder having parallel abutment surfaces, said surfaces of said holder being parallel to said cutting edges of the diamond, a supporting mount for said holder, said mount providing a plane surface adapted to engage an abutment surface of said holder, and means for attaching said holder to said mount.

2. In a profiling diamond having two cutting edges comprising a pair of surfaces of the same shape oppositely disposed to each other, the said surfaces being interchangeably operative when the diamond is turned about 180°, a holder for the diamond rectangular in cross section, the said surfaces of said holder being parallel to said cutting edges of the diamond, a device having an L-shaped abutment against which a corner of the holder is fitted for properly positioning the holder thereon, and means for retaining the holder and device assembled.

3. A profiling diamond, said diamond being wedge-shaped and having parallel wedge-shaped end surfaces, said end surfaces comprising oppositely disposed cutting edges, and a holder for said diamond, said holder having an abutment surface thereon, said end surfaces of said diamond being parallel to said surface of said holder, and a supporting mount for said diamond and holder, said mount including a supporting surface adapted to engage said abutment surface of said holder, and means for removably attaching said holder to said mount.

ROBERT STOPP.